United States Patent Office 3,422,793
Patented Jan. 21, 1969

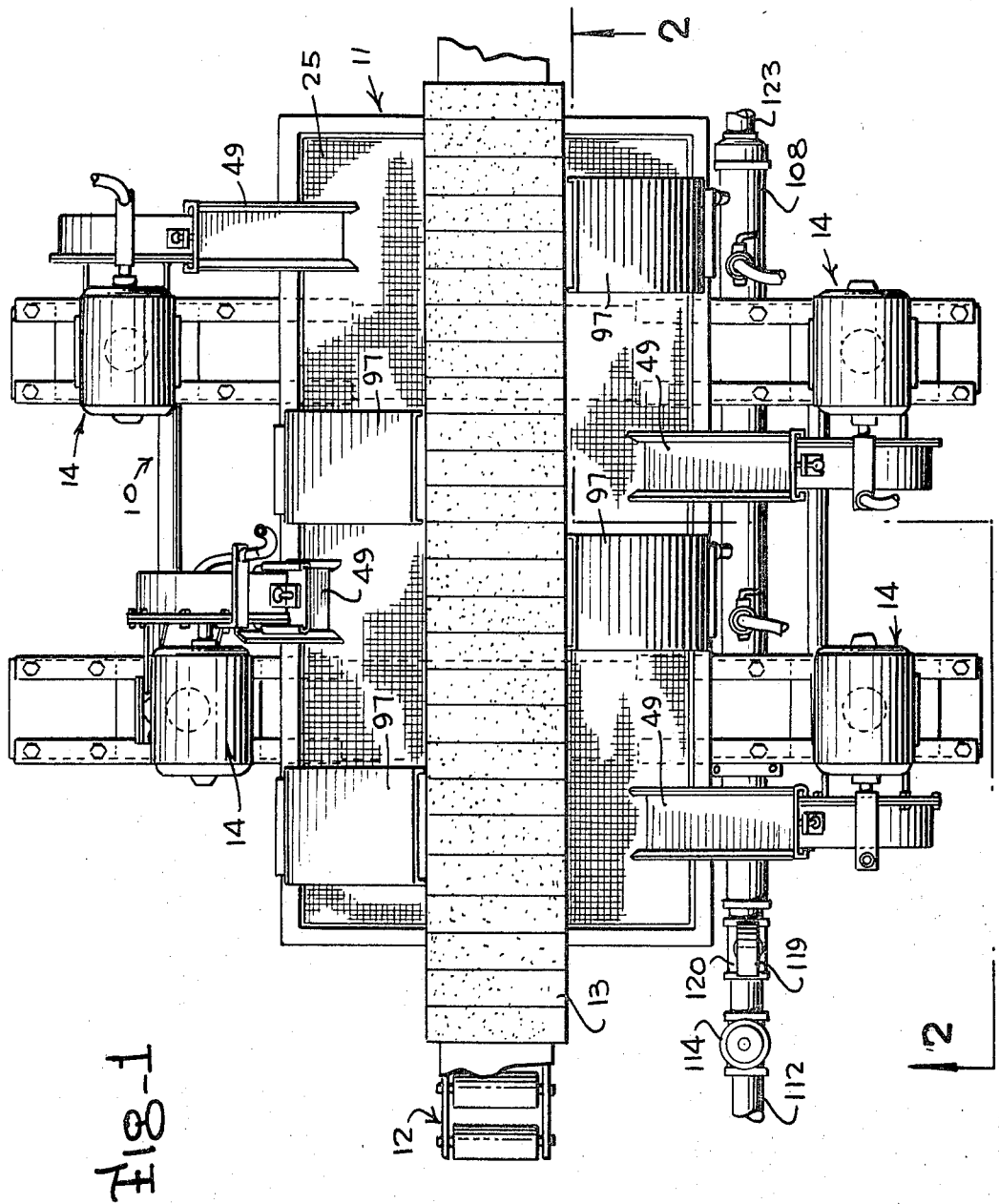

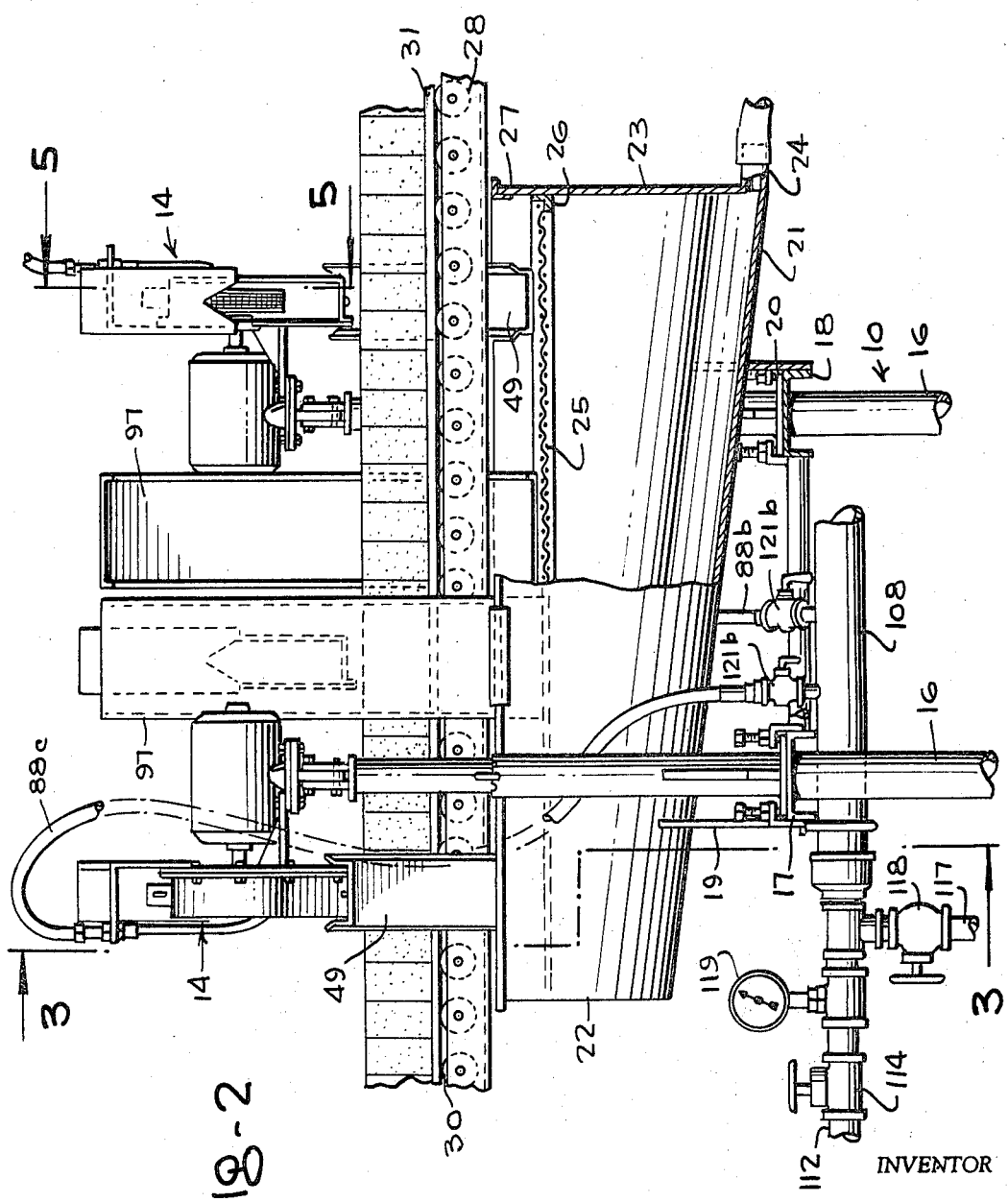

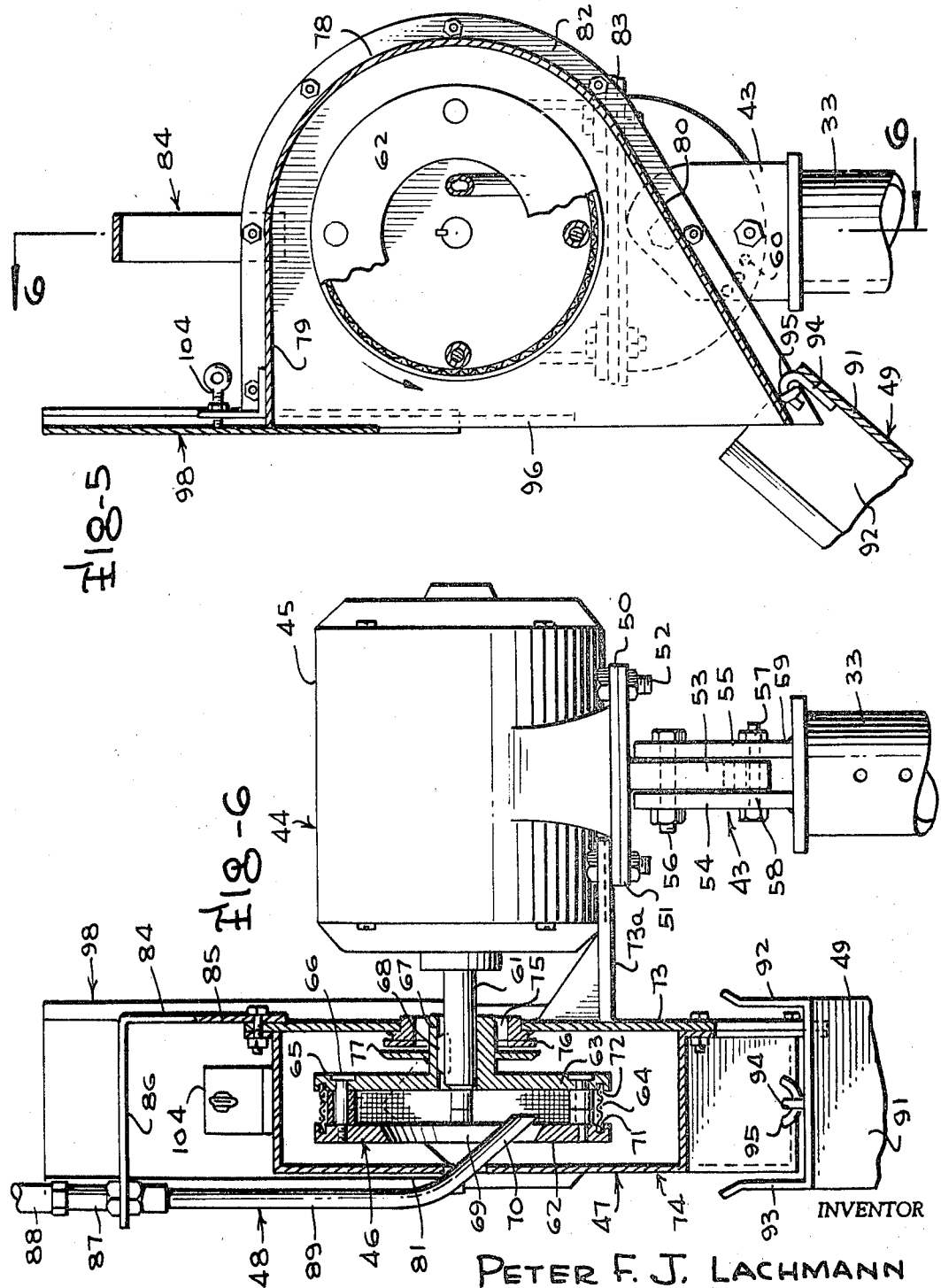

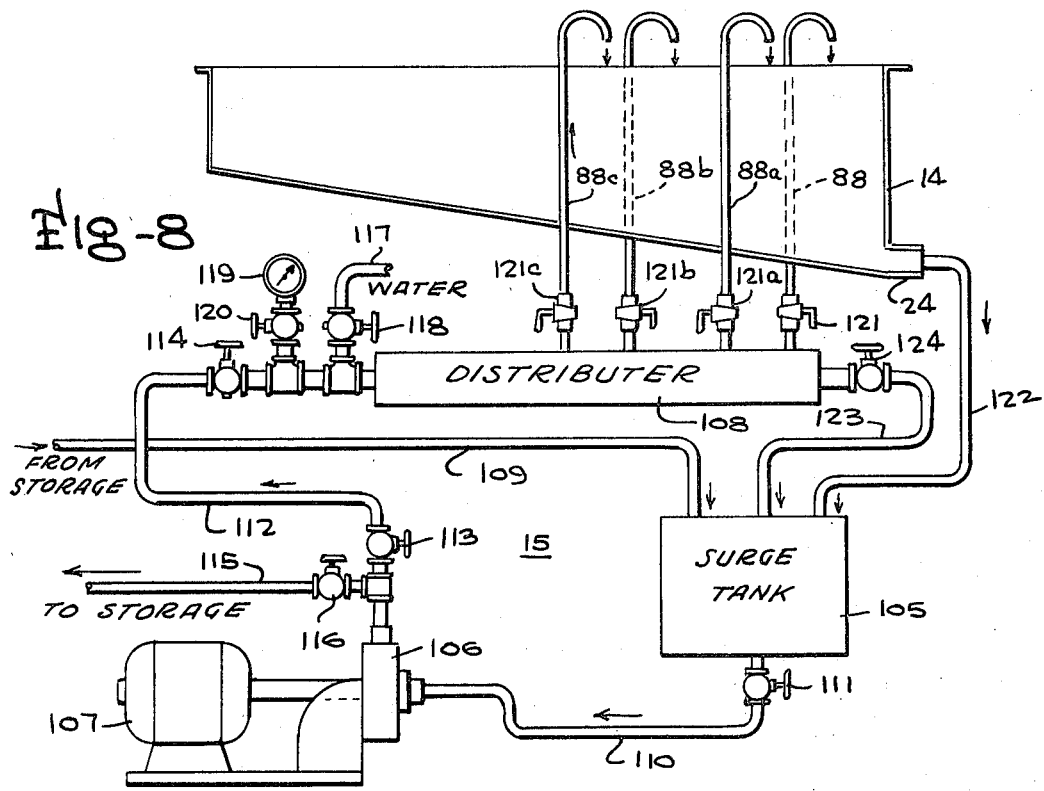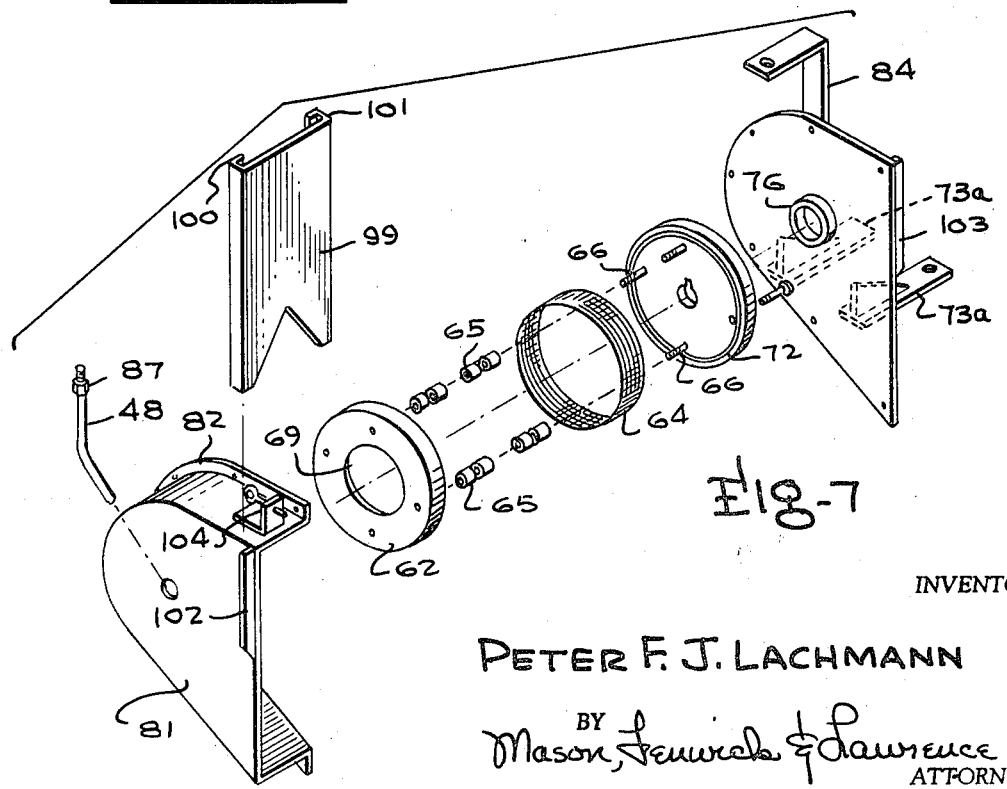

3,422,793
APPARATUS FOR APPLYING
FLUID MATERIALS
Peter F. J. Lachmann, Henderson, Tex., assignor to Henderson Clay Products, Inc., Henderson, Tex., a corporation of Texas
Filed May 12, 1967, Ser. No. 638,118
U.S. Cl. 118—301                                      15 Claims
Int. Cl. B05b 15/04; 1/28

ABSTRACT OF THE DISCLOSURE

An apparatus for applying a fluid material on a plurality of articles comprising means for advancing the articles along a line of travel, circuit means for circulating the fluid material, including at least one means for dispersing the material onto the articles, means for recovering the material and means for recirculating the material, the dispersing means comprising rotatable means having a chamber, the chamber having a perforated annular wall, the rotatable means having an opening communicating directly with the chamber, means for supplying the circulating fluid directly to the chamber extending through the opening into the chamber, and means for rotating the rotatable means whereby fluid supplied directly into the chamber is caused to be ejected by centrifugal force through the perforated annular wall in a dispersion onto the articles.

Background of the invention

This invention relates to an apparatus for applying a fluid material on a plurality of articles, and more particularly to an apparatus for coating a moving column of ceramic articles with a fluid ceramic coat of high viscosity, high specific gravity and highly abrasive properties. This invention further contemplates a novel centrifugal spray device utilized in such apparatus, capable of dispersing heavy ceramic slurries and slips of fine or coarse grain sizes with thixotropic properties, onto a moving column of brick or tile during a clay extrusion process.

In the ceramic industry, it often is desirable to apply coatings to brick or clay products. Usually, such coatings are thixotropic in character, having a relatively high viscosity, high specific gravity and highly abrasive properties. Such coating materials commonly are carried during the coating process by a fluid such as water, which acts as a vehicle for the coating material.

In the prior art, various methods have been employed for applying such coating materials to clay products. These methods include brushing, spraying, dipping and pouring. Each of these conventional methods, however, have been found to be unsatisfactory from the viewpoint of quality control and efficiency of operation. Such conventional methods of applying coating materials on ceramic products have required complicated and inadequate applicator apparatus, due primarily to the characteristics of the coating materials.

The present invention and the process practiced thereon particularly are adapted to the requirements of the ceramic industry in coping effectively with problems which in many respects are different from the coating problems of other industries. The particular coating problems incurred in the ceramic industry result primarily from the complicated relationship between clay and water. These complications are attributed to a combination of several factors, including the negative charges on clay articles, the laminar form of clay particles, the absorption of water on clay particles, and the high surface tension of water. In addition, due to the thixotropic properties of the coating materials utilized in the ceramic industry, breakdowns caused by mechanical failure and intermittent shutdowns of equipment are further complicated by the cementation of the coating materials normally circulating in such equipment.

Summary of the invention

The principal purpose of the present invention is to provide a novel apparatus for applying a coating material on articles.

Another object of the present invention is to provide a novel apparatus for applying coating materials having thixotropic properties, on articles.

A further object of the present invention is to provide a novel apparatus for applying a coating material having a relatively high viscosity, high specific gravity and/or high abrasive properties on a column of moving articles.

A still further object of the present invention is to provide a novel apparatus for applying a coating material having thixotropic properties on a moving column of clay products, in which water is used as a vehicle for carrying the coating materials.

Another object of the present invention is to provide a novel apparatus for applying a coating material on a moving column of articles, in which the coating material may continue to be circulated through the apparatus during breakdown or intermittent shutdown of the apparatus.

A further object of the present invention is to provide a novel apparatus for applying a coating material having thixotropic properties on articles, in which cementation of the coating material is avoided during breakdown or intermittent shutdown of the apparatus.

A further object of the present invention is to provide an improved apparatus for applying a coating material on a moving column of articles by dispersion, in which residual dispersed material is recovered by a simple recovery device.

A still further object of the present invention is to provide a novel apparatus for applying a coating material on a moving column of articles, in which a maximum amount of residue material is reclaimed and recirculated through the apparatus.

Another object of the present invention is to provide a novel device for dispersing a material having fluid properties.

A further object of the present invention is to provide a novel device for dispersing a fluid material having relatively high viscosity, high specific gravity and/or high abrasive properties.

A still further object of the present invention is to provide a novel device for dispersing a fluid material having thixotropic properties.

Another object of the present invention is to provide a novel device for dispersing a fluid material having thixotropic properties which is adapted to prevent cementation of the fluid material when the device is inoperative.

A further object of the present invention is to provide a novel device for dispersing or spraying a fluid material having thixotropic properties, which has relatively few parts and is simple in construction.

Another object of the present invention is to provide a novel apparatus for applying a coating material on a moving column of articles, which is relatively simple in construction and easy to maintain.

Other objects and advantages of the invention will become more apparent to those persons skilled in the art, from the following description of a practical embodiment thereof, when taken in conjunction with the drawings which accompany, and form a part of, the specification.

Brief description of the drawings

FIGURE 1 is a top plan view of an embodiment of the invention.

FIGURE 2 is a cross-sectional view taken along line 2—2 in FIGURE 1.

FIGURE 5 is an enlarged cross-sectional view taken along line 5—5 in FIGURE 2.

FIGURE 6 is a cross-sectional view taken along line 6—6 in FIGURE 5.

FIGURE 7 is a perspective view of the dispersing or spraying device utilized in the embodiment illustrated in FIGURES 1 through 6, illustrated in exploded relation.

FIGURE 8 is a diagrammatic-schematic view of the embodiment illustrated in FIGURES 1 through 6.

Description of the preferred embodiment

Figure 4:
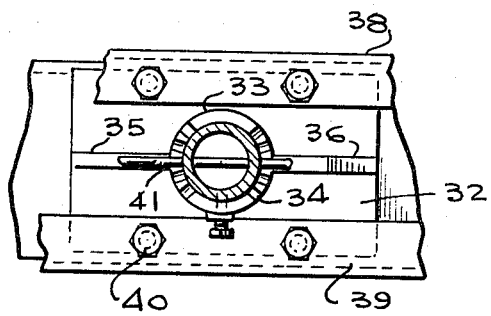
FIGURE 4 is an enlarged cross-sectional view taken along line 4—4 in FIGURE 3.

Referring to the drawings, there is illustrated the preferred embodiment of the invention. The apparatus illustrated in the drawings generally includes a frame assembly 10, a drain receptacle 11 mounted on the frame assembly, a conveyor assembly 12 mounted on the drain receptacle, which is adapted to advance a column of bricks 13 across a predetermined line of travel disposed longitudinally relative to the drain receptacle, a plurality of dispersing or spraying devices 14 which are mounted on the frame assembly on both sides of the conveyor assembly and spaced longitudinally relative to each other on each side thereof, and a fluid circuit 15 which is mounted on the frame assembly and best illustrated diagrammatically and schematically in FIGURE 8.

The frame assembly consists of four support post members 16 having a pair of longitudinally spaced, transversely disposed channel frame members 17 and 18 mounted on the upper ends thereof. Secured to the channel frame members 17 and 18 are upstanding bracket members 19 and 20. The bracket members 19 and 20 are disposed transversely and are provided with arcuate upper edges on which the drain receptacle 11 is seated and rigidly secured.

The drain receptacle 11 consists of a transversely curved wall member 21 seated on the bracket members 19 and 20, a front end wall 22 and a rear end wall 23. As best illustrated in FIGURE 2, the radius of the wall member 21 increases gradually along the length thereof to provide a rearwardly and downwardly inclined bottom wall portion. The inclined wall portion is adapted to cause residual fluid material received within the drain receptacle to flow downwardly toward the rear end wall 23, wherefrom the fluid is discharged into an outlet conduit 24. Foreign matter falling or carried into the drain receptacle is removed by means of a filter screen 25 which covers the entire upper area of the drain receptacle and is supported on a peripheral flange member 26, secured to the upper ends of the wall members 21, 22 and 23. The peripheral portions of the filter screen 25 are adapted merely to be seated on the peripheral flange member 26, so that the filter screen can be easily removed and replaced. The upper ends of the wall members 21, 22 and 23 are provided with a peripheral flange 27. The conveyor assembly 12 is seated on the longitudinally spaced front and rear sections of the flange 27.

Figure 3:
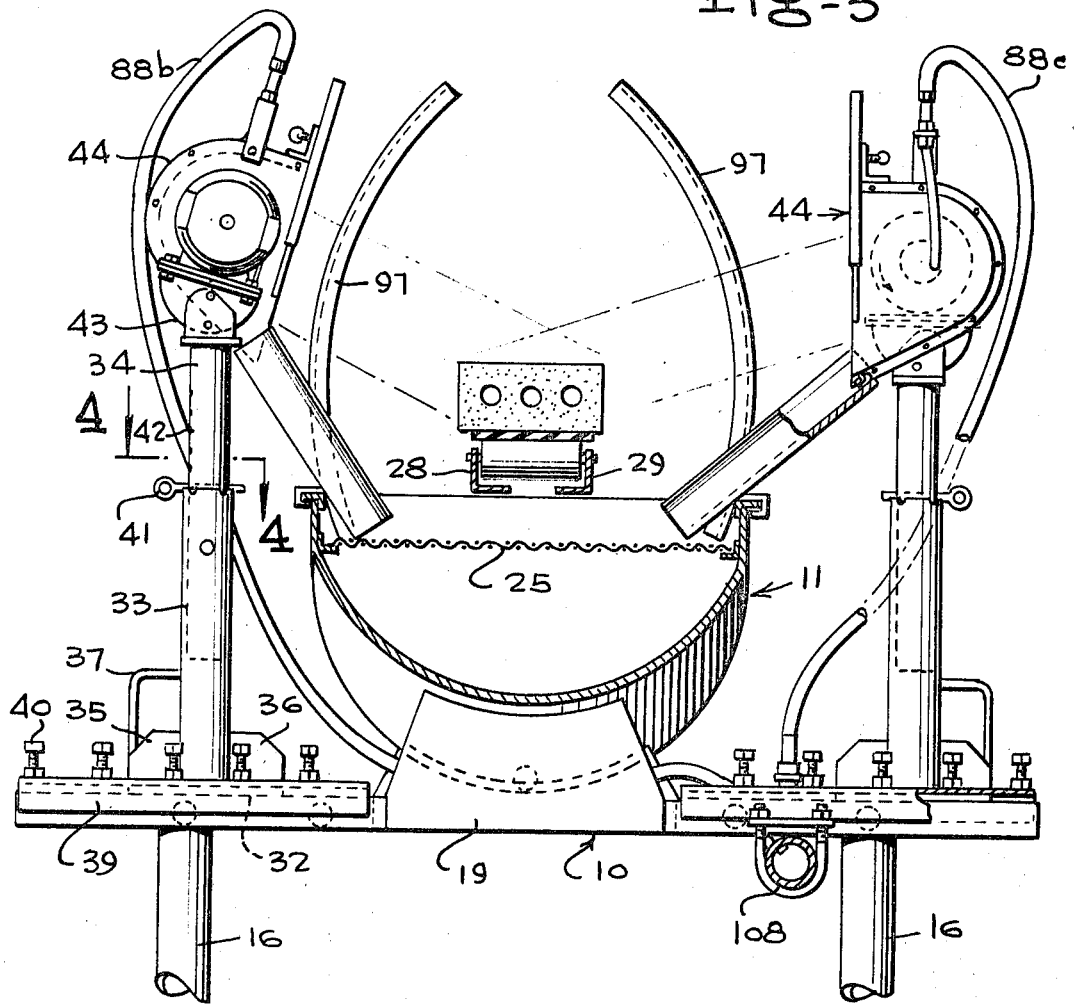
FIGURE 3 is a cross-sectional view taken along line 3—3 in FIGURE 2.

The conveyor assembly consists of a pair of elongated, transversely spaced L-shaped beams 28 and 29 seated on the front and rear sections of the peripheral flange 27, a plurality of rollers 30 journaled in the beam members 28 and 29, and a conveyor belt 31 supported on the rollers 30, which carries the column of bricks 13. As best illustrated in FIGURES 1 through 3, the column of bricks is supported on the conveyor assembly so that the side and uppper surfaces of the bricks are exposed to the spraying devices 14. It will be appreciated that a suitable drive is provided for the conveyor belt, which can be continuous or intermittent, as desired. In addition, the conveyor belt preferably is of the endless type, having a suitable return flight passing beneath the frame assembly, having suitable drive and idler rollers.

Each of the dispersing or spraying devices 14 are substantially identical in construction and operation. As many of the devices 14 can be utilized, as desired. The devices can be placed on either side of the conveyor assembly and along the line of travel thereof. Furthermore, the position of each of the devices can be adjusted to provide the desired spray pattern of the coating material trained on the column of bricks advanced through the apparatus on the conveyor assembly.

As best illustrated in FIGURES 1 through 3, each device 14 is provided with a base plate member 32 which is seated on a frame support member 17 or 18, and slidable along the length thereof, transversely, a lower tubular post member 33 mounted on the base plate member, and an upper post member 34 telescopically received within the upper end of the post member 33. The mounting of the post member 33 on the base plate member is reinforced by a pair of gusset plates 35 and 36. The device is moved transversely on the frame support member 18 manually by means of a handle member 37. The base plate member is movable transversely within a pair of transversely disposed keeper plates 38 and 39, as best illustrated in FIGURE 4. When the base plate member 32 has been moved to the desired position, the device may be rigidly secured in such position by means of bolts 40, which are threaded into openings in the keeper plates 38 and 39 and are adapted to engage the upper surface of the base plate member 32.

The upper post member 34 may be adjusted vertically relative to the lower post member 33 and may be fixed in the desired position relative to the post member 33 by means of a pin member 41. As best illustrated in FIGURES 3 and 4, the upper post member 34 is provided with a series of diametrically aligned openings 42, which are adapted to receive the pin member 41 therethrough. The length of the pin member 41 is made sufficiently long so that the ends thereof are adapted to be seated in aligned grooves formed about the circumference of the upper end of the support post member 33. It also will be appreciated that the upper post member 34 can be rotated about its vertical axis relative to the lower post member 33. Provided on the upper end of the upper post member 34 is a mounting bracket 43 consisting of a clevis member. The spraying head 44 of the device 14 is mounted on the mounting bracket 43.

Referring to FIGURES 5 through 7, there is illustrated a typical spray head 44 in detail. The spray head includes an electric motor 45, a rotary slinging mechanism 46 driven by the motor, a cowling assembly 47 housing the rotary slinging mechanism and mounted on the motor base, a fluid supply tube 48 mounted on the cowling and a drain chute 49 also mounted on the cowling. The motor 45 is provided with a base member 50, which is secured to a support platform 51 by means of bolt and nut assemblies 52. The support platform 51 is provided with a depending bracket element 53 which is received between the ear elements 54 and 55 of the mounting bracket 43. The support platform 51, including the depending element 53 is connected to the mounting bracket 43 by means of bolt and nut assemblies 56 and 57. The bolt of the upper assembly 56 is received through registerable openings in the ear elements 54 and 55 and the depending element 53. As best shown in FIGURE 5, the entire spray head 44 can be pivotally adjusted about the axis of the assembly 56. The ear elements 54 and 55 are provided with aligned openings 58 and 59, which are registerable with a plurality of openings 60 in the lower end of depending element 53, which openings are radially disposed relative to the axis of the upper assembly 56. It will be appreciated that the spray head can be angularly adjusted about the axis of upper assembly 56 and maintained in such position by means of the lower assembly 57, having the bolt member thereof inserted through aligned openings 58 and 59 and a registered opening 60.

As shown in FIGURE 6, the rotary slinging mechanism 46 is mounted on the end of the drive shaft 61 and is adapted to be driven thereby about the axis of the drive shaft. The slinging mechanism consists of a pair of axially spaced, rotor disc or plate members 62 and 63 having an annular mesh screen 64 interposed therebetween and disposed coaxially relative to the drive shaft 61. The plate members 62 and 63 are maintained in spaced relation by means of circumferentially spaced spacing elements 65. The plate members also are secured together by means of connecting bolts 66. The plate member 63 is provided with a hub portion 67, which is keyed to the drive shaft 61 by means of a key element 68. Also, the outer plate member 62 is provided with an axial opening 69 for receiving the lower end 70 of the fluid supply tube 48 therethrough.

The inner peripheral portions of the plate members 62 and 63 are provided with annula rrecesses 71 and 72, in which the outer ends of the annular mesh screen 64 are received. It will be appreciated that by removing the bolt members 66, the entire slinging mechanism 46 can be readily disassembled to permit removal and replacement of the annular mesh screen. It further will be appreciated that the effective emission surface of the slinging mechanism 46 can be varied by utilizing spacers 65 and mesh screens 64 of various widths.

The cowling assembly has two major components including a base plate member 73 and a cover member 74. The base plate member is disposed vertically and is secured to the base member 50 of the electric motor by means of a pair of laterally extending mounting brackets 73a. The base plate member also is provided with an opening 75 having a bushing 76 mounted therein through which the drive shaft 61 extends into the cowling. The hub 67 of the inner plate member 63 is provided with an annular collar member 77 which shields the opening 75 from the interior of the cowling.

As best shown in FIGURE 5, the cover member 74 is provided with an arcuate rear wall section 78 which is concentric with and spaced from the circular plate members 62 and 63, a top wall section 79 disposed tangentially relative to the rear wall section, a bottom wall section 80, disposed tangentially relative to the rear wall section and angularly to the top wall section, and an end wall 81. The wall sections 78, 79 and 80 of the cover plate member are provided with a peripheral flange 82 for mounting the cover plate member 74 on the base plate member 73 by means of a plurality of bolts 83.

Also secured to the base plate member 73 is a support bracket 84, having an upwardly projecting portion 85 and an outwardly projecting portion 86. As shown in FIGURE 6, a fitting 87 is mounted on the outer end of the portion 86 of support bracket 84. The fluid supply tube 48 is connected to the bottom of the fitting 87 and communicates through the fitting 87 to a fluid supply line 88. It will be noted that the fluid supply tube 48 includes a downwardly projecting portion 89 and the inwardly projecting portion 70 extending through an opening in the end plate member 81 and the axial opening 69 in outer rotor plate member 62 so that fluid will be supplied through the tube into the chamber disposed between the rotor plate members 62 and 63.

As fluid coating material is supplied to the rotary slinging mechanism 46 and the mechanism is rotated in the direction as illustrated by the arrow in FIGURE 5, the fluid coating material within the slinging mechanism will be thrown outwardly under the influence of centrifugal force and through the mesh screen, causing the fluid material to be ejected tangentially in a dispersion or spray pattern. The dispersed material thrown against the wall sections 78, 79 and 80 of the cowling assembly will flow downwardly along the inner surface of the wall section 80 and will drain into the darin receptacle 11 via the drain chute 49, bridging the space below the lower front end of the wall section 80 and a side edge of the drain receptacle. The drain chute 49 is provided with a bottom wall 91 and upwardly extending, spaced side walls 92 and 93. The side walls 92 and 93 are spaced apart a distance slightly greater than the width of the cowling so that the lower end of the cowling is received within the upper end of the drain chute. The upper end of the drain chute is suspended from the cowling by means of a hook element 94 which hooks onto an eye element 95 secured to the lower front end of the wall section 80 of the cover member.

The front opening 96 in the cowling assembly faces the advancing column of bricks 13, whereby the spray of fluid coating material ejected through the opening 96 will be directed onto the advancing column of bricks. Dispersed coating material overriding the column of bricks will be intercepted by a baffle member 97 mounted on the opposite edge of the drain receptacle 11 in alignment with the opening 96 in the cowling. Fluid coating material intercepted by the baffle member 97 will be caused to drain into the drain receptacle.

The spray pattern emanating from the slinging mechanism 46 can be adjusted in vertical width by means of a gate assembly 98 mounted on the cowling. As best illustrated in FIGURES 5 through 7, the gate assembly includes a vertically movable gate member 99, having inwardly extending flanges 100 and 101 guided vertically on guide flanges 102 and 103, provided on the upper front ends of base plate member 73 and end plate wall 81 of cover member 74. A set screw 104 secured on the top wall section 79 of the cover member 74 can be utilized to maintain the gate member 99 in the desired position. It will be appreciated that by moving the gate member 99 vertically along guide flanges 102 and 103 the vertical width of the opening 96 in the cowling, and correspondingly, the vertical width of the fluid spray pattern can be adjusted.

Referring to FIGURE 8, there is illustrated a diagrammatic-schematic view of the fluid circuit. Included in the circuit are a surge tank 105, an impeller pump 106 driven by an electric motor 107, a distributor 108, the dispersing or spraying devices 14 (not shown in FIGURE 8) and the drain receptacle 11. The coating material is supplied to the surge tank 105 through a line 109. The coating material is fed to the impeller pump 106 from the surge tank through a fluid line 110 having a cut-off valve 111. The discharge end of the pump 106 is connected to the distributor 108 by means of a fluid line 112, which includes cut-off valves 113 and 114. Connected to the fluid line 112 between the discharge end of the impeller pump 106 and the cut-off valve 113 is a fluid return line 115 which is provided with a cut-off valve 116. It will be appreciated that by closing valve 113, opening valve 116 and operating the impeller pump 106, fluid in the system will be pumped to the storage tank through the fluid return line 115. Also connected to the fluid line 112 between the cut-off valve 114 and the distributor is a water supply line 117 having a cut-off valve 118. A manometer 119 also is connected to the fluid line 112, having a cut-off valve 120.

The fluid coating material is supplied to the spray devices 14 through fluid supply lines **88, 88*a*, 88*b* and 88*c*, each provided with cut-off valves 121, 121*a*, 121*b* and 121*c*. Residual fluid coating material draining into the drain receptacle 14 is caused to flow through the outlet conduit 24 and through fluid return line 122 to the surge tank 105. A bypass line 123 having a cut-off valve 124 interconnects the distributor 108 and the surge tank 105**.

In the operation of the embodiment as described, circulation of the fluid coating material first is begun. This is accomplished by filling the surge tank 105 through line 109, opening valves 111, 113, 114 and 124 and closing valves 116, 118 and 121 through 121c. Then the impeller pump 106 is started and under such conditions the coating material carried by the water in the circuit will circulate from the surge tank 105 through pump inlet line 110 and pump outlet line 112 to the distributor 108, and through bypass line 123 back to the surge tank 105. After this circuit is filled and the desired pressure in the circuit is indicated by manometer 119, the valves 121 and 121c are opened so that a part of the fluid coating material is supplied through fluid supply lines 88 through 88c to the fluid supply tubes 48 of the spray devices 14. After this is accomplished, the pressure of the fluid bypassing valves 121 and 121c is adjusted. This pressure adjustment regulates the amount of coating fluid injected into the spray devices 14 through lines 88 through 88c. This regulation is accomplished by simply reducing or increasing the flow rate of fluid coating material through valve 124. Simultaneously, the drive mechanism of the conveyor assembly is started so that the column of bricks will advance past the spray devices and the motors 45 are energized to rotate the slinging mechanism 14.

To clean the fluid circuit, valve 116 is opened, valve 113 is closed, and the remaining fluid coating material is pumped back to a storage tank. After this is accomplished, valve 113 is reopened and valve 116 is closed again. Valve 118 is opened and water is introduced into the circuit under normal water pressure, thus enabling the operator to flush and clean all pipes, the distributor 108, all valves, the surge tank 105, the impeller pump 106 and the slinging devices 14.

The fluid coating material is introduced into the rotary slinging mechanism 46 of each spray device and is caused to be ejected outwardly by centrifugal force through the annular mesh screen 64, emanating in a spray pattern through the opening 96 toward the line of travel of the column of bricks 13. The portion of the spray pattern of the fluid coating material impinging upon the column of bricks will uniformly coat the bricks with the material. That portion of the spray pattern directed over the column of bricks will be intercepted by the arcuate baffle member 97 and caused to drain into the drain receptacle. That portion of the spray pattern directed below the column of bricks will be intercepted by the drain receptacle. In addition, fluid coating material intercepted by the wall sections 78, 79 and 80 of the cowling will be caused to flow downwardly along the drain chute 49 into the drain receptacle. The residual fluid coating material collected by the drain receptacle will flow through the outlet conduit 24 and through the return line 122 to be recirculated through the system. It will be appreciated that the filter screen 25 will prevent foreign matter from being introduced into the fluid circuit.

The spray devices 14 can be adjusted by moving the same transversely on the frame support members 17 and 18, by tilting the spray heads on the mounting brackets 43 and turning the same about their vertical axes to train the spray pattern on the column of bricks, as desired. In addition, the spray pattern can be adjusted in vertical and horizontal width by adjusting the size of the opening 96 with the sliding gate assembly 98 and utilizing annular mesh screens of various widths.

In the event of any breakdown of any of the spray devices, it will be appreciated that the circulation of the fluid coating material will continue unobstructed, thereby preventing any cementation of the material in the spray device. Furthermore, it will be seen that the fluid coating material can be continued to recirculate in the fluid circuit without flowing through any of the sprayed devices, simply by opening valve 124 and closing valves 121 through 121c, thereby causing the fluid coating material to bypass the spray devices from the distributor through the bypass line 123 into the surge tank.

The apparatus as described particularly is adapted for use with a clay extrusion system. The electric motors of the spraying devices can be electrically connected to the electric circuit for the extrusion system, so that if the extrusion system is stopped, the rotary slinging mechanisms also will stop while the material in the fluid system of the apparatus will continue to circulate, thereby preventing any cementation in the fluid circuit.

It further will be appreciated that the apparatus can be used to spray a column of bricks with any type of material having fluid characteristics. This includes various types of abrasive materials. Whatever the material being sprayed, the size of the mesh screen is selected so that the openings are no smaller than the particles of the material being sprayed.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A device for dispersing a material having fluid properties comprising support means, a base member mounted in said support means, rotating means mounted on said base member, rotatable means mounted on said rotating means including a pair of axially spaced plate members, spacers removably interposed between said plate members, an annular perforated member interposed between said plate members and means for removably securing said plate members together with said spacers and perforated member interposed therebetween, one of said plate members having an opening communicating with the interior of said rotatable means, stationary means extending through said opening for supplying fluid directly into the interior of said rotatable means whereby upon rotation of said rotatable means fluid supplied directly into the interior thereof is caused to be ejected by centrifugal force through said perforated annular member in a dispersion, stationary housing means encompassing said rotatable means, said stationary housing means having an opening therein adjacent said annular perforated member and means for adjusting the size of said opening whereby upon adjusting the spacing between said plate members of said rotatable means and the opening of said housing means the dispersing pattern of fluid ejected from said rotatable means may be adjusted.

2. A device for dispersing a material having fluid properties according to claim 1, wherein said means for adjusting the size of the opening in the housing means comprises a sliding gate member.

3. A device for dispersing a material having fluid properties according to claim 1, wherein the perforated annular wall comprises a mesh screen.

4. A device for dispersing a material having fluid properties according to claim 1, wherein said plate members are provided with opposed annular recesses for receiving said annular perforated member.

5. A device for dispersing a material having fluid properties according to claim 1, wherein said fluid supply means comprises a stationary fluid supply tube.

6. A device for dispersing a material having fluid properties according to claim 1, wherein said base member is adjustable relative to said support means.

7. An apparatus for applying a material having fluid properties on at least one article comprising means for advancing said article along a line of travel, circuit means for circulating said material including at least one device for dispersing said material onto said article, means for recovering said material and means for recirculating said material, said dispersing device comprising support means, a base member mounted on said support means, rotating means mounted on said base member, rotatable means mounted on said rotating means including a pair of axially spaced plate members, spacers removably interposed between said plate members, an annular perforated member interposed between said plate members and means for removably securing said plate members together with said spacers and perforated member interposed therebetween, one of said plate members having an opening communicating with the interior of said rotatable means, stationary means extending into said opening for supplying fluid directly into the interior of said rotatable means whereby upon rotation of said rotatable means fluid supplied directly into the interior thereof is caused to be ejected by centrifugal force through said perforated annular member in a dispersion directed toward said article, stationary housing means encompassing said rotatable means, said stationary housing means having an opening therein adjacent said annular perforated member and means for adjusting the size of said opening whereby upon adjusting the space between said plate members of said rotatable means and the opening of said housing means the dispersing pattern of fluid ejected from said rotatable means may be adjusted.

8. An apparatus according to claim 7, wherein said recovering means is disposed below said advancing means and said dispersing device, for receiving residual material draining therefrom.

9. An apparatus according to claim 7, wherein said recirculating means comprises a fluid pump.

10. An apparatus according to claim 7, including means for selectively introducing said material into said circuit means and means for selectively introducing a carrier fluid for said material into said circuit means.

11. An apparatus according to claim 7, wherein the fluid supply means of said dispersing device comprises a stationary fluid supply tube forming a part of said circuit means.

12. An apparatus according to claim 7, wherein said means for adjusting the size of the opening in the housing means of the dispersing device comprises a sliding gate member.

13. An apparatus according to claim 7, wherein the perforated annular wall of the rotatable member of the dispersing device comprises a mesh screen.

14. An apparatus according to claim 7, wherein the plate members of the rotatable means of the dispersing device are provided with opposed annular recesses for receiving the annular perforated member.

15. An apparatus according to claim 7, wherein the base member of the dispersing device is adjustable relative to the support means of the dispersing device.

References Cited

UNITED STATES PATENTS

| | | | |
|---|---|---|---|
| 670,998 | 4/1901 | Patterson | 239—223 |
| 2,078,223 | 4/1937 | Andrew | 118—301 |
| 2,233,855 | 3/1941 | Süss | 239—223 |
| 2,734,479 | 2/1956 | Norris | 118—326 |
| 2,854,946 | 10/1958 | Norris | 118—326 X |
| 2,992,778 | 7/1961 | Martin | 239—223 |
| 3,279,427 | 10/1966 | Clancy et al. | 118—301 X |

FOREIGN PATENTS 192,593　10/1957　Austria.

WALTER A. SCHEEL, Primary Examiner.

JOHN P. McINTOSH, Assistant Examiner.

U.S. Cl. X.R.

118—324, 326; 239—222, 223